US 10,053,831 B2

(12) United States Patent
Schaden

(10) Patent No.: US 10,053,831 B2
(45) Date of Patent: Aug. 21, 2018

(54) PROCESS AND ASSEMBLY FOR DETERMINING THE RADIUS OF A GROUND ELEMENT WHICH CAN BE PRODUCED BY JET GROUTING

(71) Applicant: Keller Holding GmbH, Offenbach/Main (DE)

(72) Inventor: Hans Jürgen Schaden, Jabing (AT)

(73) Assignee: Keller Holding GmbH, Offenbach/Main (DE)

( * ) Notice: Subject to any disclaimer, the term of this patent is extended or adjusted under 35 U.S.C. 154(b) by 127 days.

(21) Appl. No.: 14/916,270

(22) PCT Filed: Sep. 1, 2014

(86) PCT No.: PCT/EP2014/068498
§ 371 (c)(1),
(2) Date: Mar. 3, 2016

(87) PCT Pub. No.: WO2015/032716
PCT Pub. Date: Mar. 12, 2015

(65) Prior Publication Data
US 2016/0222619 A1   Aug. 4, 2016

(30) Foreign Application Priority Data

Sep. 3, 2013   (EP) ..................................... 13182780

(51) Int. Cl.
*E02D 3/12*   (2006.01)
*E02D 5/46*   (2006.01)
*G01B 17/00*   (2006.01)

(52) U.S. Cl.
CPC ............... *E02D 5/46* (2013.01); *G01B 17/00* (2013.01)

(58) Field of Classification Search
CPC .................................... E02D 3/12; E02D 5/46
See application file for complete search history.

(56) References Cited

U.S. PATENT DOCUMENTS 5,672,825 A * 9/1997 Uno ..................... G01N 29/045
73/579

FOREIGN PATENT DOCUMENTS

AT       505438 A1    1/2009
DE    19521639 A1    5/1996
(Continued)

OTHER PUBLICATIONS

Machine Translation of Japanese doucment '250, Oct. 11, 2011, 7 pages.*

(Continued)

*Primary Examiner* — Sunil Singh
(74) *Attorney, Agent, or Firm* — Dinsmore & Shohl LLP

(57) ABSTRACT

The invention relates to a method for determining the radius of a pile in the ground that can be produced by means of a jet-grouting process, comprising the steps of: introducing at least one level-measuring stick into the ground; sinking a jet-grouting tool (3) down to a defined distance from the level-measuring stick (4), the distance being less than a maximum range R of the grouting jet; pulling the jet-grouting tool (3) while performing a rotating or swivelling motion with the grouting jet activated, thereby producing vibrations as the grouting jet passes the level-measuring stick (4); and recording a signal representative of the vibrations at the at least one level-measuring stick (4) by means of a sensor (5) that is fastened to the level-measuring stick (4). The invention also relates to a corresponding arrangement (2) for determining the radius of a pile in the ground that can be produced by means of a jet-grouting process.

18 Claims, 2 Drawing Sheets

(56) References Cited

FOREIGN PATENT DOCUMENTS

| | | |
|---|---|---|
| DE | 19731223 A1 | 2/1999 |
| EP | 2009184 A2 | 12/2008 |
| JP | 2011-226250 A * | 11/2011 |

OTHER PUBLICATIONS

International Search Report, International Application No. PCT/EP2014/068498, Filed Sep. 1, 2014.

* cited by examiner

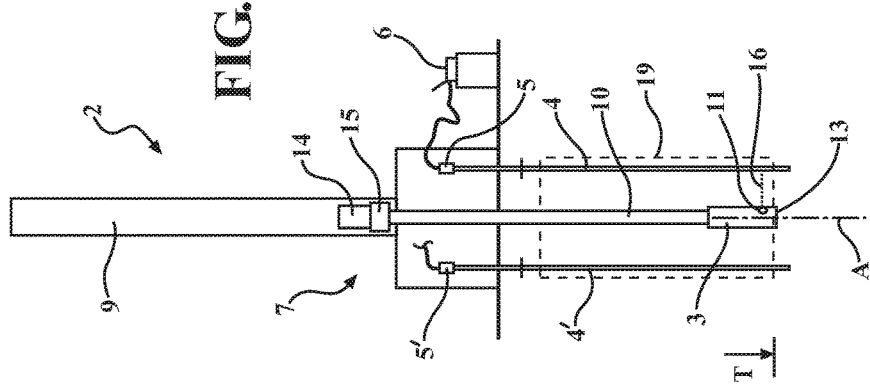
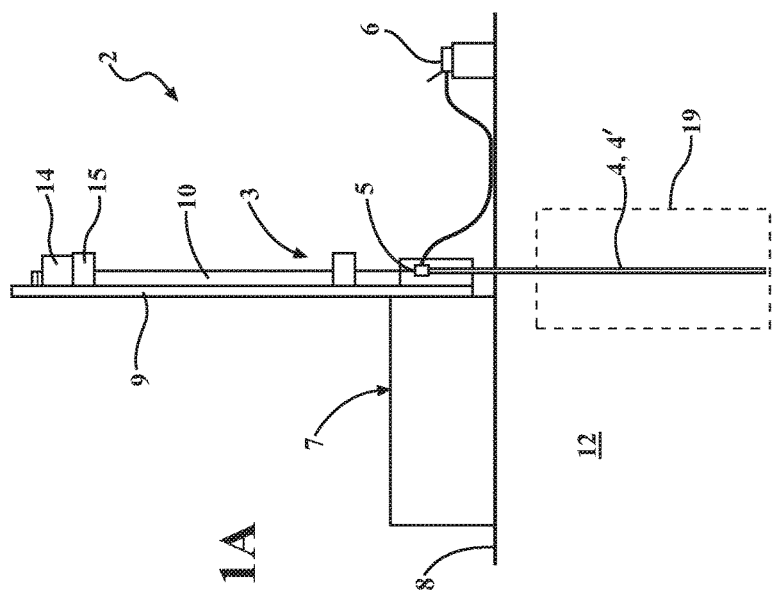
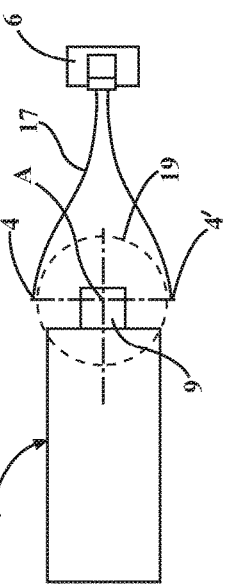

PROCESS AND ASSEMBLY FOR
DETERMINING THE RADIUS OF A
GROUND ELEMENT WHICH CAN BE
PRODUCED BY JET GROUTING

CROSS-REFERENCE TO RELATED
APPLICATIONS

This application is the U.S. national phase of PCT/EP2014/068498 filed Sep. 1, 2014, which claims priority of European Patent Application 13182780.0 filed Sep. 3, 2013.

FIELD OF THE INVENTION

The invention refers to a process and assembly for determining the radius, and diameter respectively, of a soil element which can be produced, more particularly by jet grouting.

BACKGROUND OF THE INVENTION

To consolidate the ground, for example by underpinning, or for sealing the ground, for example underneath dams or excavation pits, use is made of injection technology which is also known as jet grouting. Jet grouting is a soil grouting method wherein an energy-rich cutting jet consisting of water and a cement suspension is used to cut and erode the soil contained in the region of the borehole. The cutting jet which can also be surrounded by air is injected into the soil at high exit speeds. The eroded soil is repositioned and mixed with cement suspension. Part of the mixture is flushed through the annular space of the borehole towards the mouth of the borehole. This method can be used to produce construction elements of very different geometric shapes. Depending on the type of soil, the process applied and the liquid used, the width of erosion of the jet in the ground can be anything up to 2.5 meters.

The jet grouting process is used in special foundation engineering. Because of the nature of the process, the process of producing consolidated ground columns does not allow any visual monitoring. As a result, any non-uniformities in the soil structure or changes in the process parameters in the course of production can lead to a lesser quality of the ground column produced. This is the reason why, as a rule, trial columns are produced and analyzed prior to the start of the actual jet grouting work. There are different prior art methods of determining the diameter of a ground column produced by jet grouting, for instance thermal diameter measurements or hydrophone recordings.

From DE 195 21 639 A1 a method of monitoring a high-pressure injection process is known. A high-pressure injection rod with an exit nozzle for a high-pressure jet is driven into the soil. By lifting and simultaneously rotating the rod, the soil is cut open by the high-pressure jet and mixed with injection material. During the jetting operation, the soil vibrations in the vicinity of the high-pressure injection rod are recorded by a hydrophone. For this purpose, a gauge is driven into the soil in the surroundings of the high-pressure injection rod at a distance which corresponds to the expected range of the high-pressure jet. Said gauge is a pipe which is closed at its lower end, which is filled with water forming an incompressible medium and in which the hydrophone is guided. During the jetting operation, the hydrophone is guided at the level of the exit nozzle so that it is reached by the high-pressure jet exiting radially relative to the high-pressure injection rod. The resulting soil vibrations are converted to an analogue signal. In this way, it is possible to obtain information on the range of the high-pressure jet, which information is used to specifically vary the parameters of the jetting process.

From AT 505 438 A1 a method of determining the radial expansion and the content of hydraulically bonding materials of members produced by jet grouting (DSV members) is known. For this purpose, a first temperature curve is measured in a predeterminable period of time in a first range of the DSV-body; said temperature curve is then compared with reference curves. These measured temperature curves then allow to draw conclusions regarding the measurements and strength of the DSV column produced.

Thermal temperature determining methods require long preparatory periods of time, and there exists a further disadvantage in that an immediate evaluation cannot take place. The method of determining a diameter by means of a geophone can only be used down to a certain depth which, depending on the type of soil, amounts to approximately 8 to 15 meters. Furthermore, the rod and microphone have to be lifted synchronously, which requires additional technical facilities and which also leads to measuring inaccuracies if the two pieces of equipment are lifted at different speeds.

SUMMARY OF THE INVENTION

It is an object of the present invention to propose an improved process of determining the radius or diameter of ground columns produced, more particularly by jet grouting, which can be carried out quickly and can also be used down to great depths. Furthermore, it is an object of the invention to propose a suitable assembly for determining the radius or diameter of ground columns.

The objective is achieved by providing a process for determining the radius of a ground member produced by jet grouting, comprising the following process stages: introducing at least one level rod into the ground; lowering a jet grouting tool, wherein a defined distance between the level rod and the jet grouting tool, more particularly, is smaller than the maximum range of the jet; lifting the jet grouting tool while carrying out rotational or pivoting movements, while the jet is activated, wherein, while the jet passes the level rod, vibrations are generated at the level rod; and recording a signal which represents the vibrations at the at least one level rod by means of a sensor which, more particularly is fixed to the level rod.

An advantage is that the process can be carried out at the same time as the ground member is produced. Already during or immediately after the ground member has been produced it is possible to evaluate the measured results which allow conclusions regarding the radius and/or diameter of the body. Overall, the process can be carried out quickly and in a simple way. A further advantage is that said process is also suitable for obtaining reliable measurements at greater depths in excess of 10 meters. The process of recording vibrations takes place while the jet grouting tool injects injection material into the soil. In the context of the present disclosure, a maximum range of the jet, more particularly, is meant to refer to a range up to which the injection material penetrates the soil and at which vibrations can be measured at the level rod.

The jet grouting tool is suitable for producing full columnar, half-columnar or lamellae-like ground elements which can also be referred to as ground improving members or ground columns. The shape of the ground elements can be achieved by suitably controlling the jet grouting tool. For producing a column, respectively of a substantially circular-cylindrical member, the jet grouting tool is continuously rotated around its axis of rotation. Accordingly, half-columnar members can be produced by pivoting the jet grouting tool to and fro around the axis of rotation while the tool is being lowered, respectively lifted. Lamellae can be produced by introducing suspension by the jet grouting tool partially at different depths. The vibrations generated at the level rod permit conclusions regarding the depth of penetration of the injection material in this circumferential region in which the level rod is arranged relative to the axis of rotation of the jet grouting tool. The information on the radius in said circumferential region can be used to calculate the diameter of the column, if necessary. When producing a half-column or a lamella, there is no need to determine the diameter because said members extend only over part of the circumferential region around the axis of rotation.

Independently of the shape of the ground member to be produced, said process is suitable for reliably determining whether the jet, respectively the suspension, has reached the required radial range starting from the jet grouting tool. When rotating or pivoting the jet grouting tool around its own axis, the jet passes the level rod once per rotation or once per pivoting movement. If the jet is strong enough, the jet, when passing, hits the level rod, which generates vibrations. Such vibrations can be recorded by suitable sensors and evaluated by an evaluation unit, thus allowing conclusions regarding the radial depth of penetration of the jet in the ground. If the jet does not comprise the required strength ensuring that the depth of penetrations reaches the level rod, either the vibrations are less pronounced or there are no vibrations, which means that the radius of the ground column is smaller than the distance between the drilling axis and the level rod.

The process sequence is preferably such that first the at least one level rod is introduced into the ground and subsequently, the jet grouting tool is lowered at a defined distance from the at least one level rod up to the depth required for the production of the ground column. However, in principle, the reversed sequence is also conceivable, i.e. first the jet grouting rod is lowered and then one or several level rods is/are introduced at a defined distance from the jet grouting tool. After the jet grouting tool has been lowered down to the final depth, the jet is activated and the tool is lifted while being rotated or pivoted. While the tool is being rotated and lifted, an injection material is ejected out of one or several nozzles under high pressure and high speeds. Said injection material erodes the surrounding soil. Simultaneously with the erosion of the soil, a cement suspension is introduced under pressure, and as a result of the process-related turbulences, it is mixed in situ in the immediate production region. In a modified version of the process, it is also possible that the jet is activated during the lowering operation. In this case, the at least one level rod has to be introduced into the ground first. The operating pressure of the jet medium is preferably in excess of 200 bar. The exit speed of the jet medium can be in excess of 100 m/s. Depending on the type of soil, the type of process and the liquid used, the erosion width of the jet in the building ground can amount to anything up to 2.5 meters from the borehole.

The injection material can be adjusted to the subsoil conditions and to the required operating result, respectively selected accordingly. The injection material can be liquids, water, suspensions, cement loam and for chemical means in the form of solutions and/or emulsions. To consolidate the subsoil, for instance in the case of underpinning or sealing work, a suspension of water and bonding agents is used in particular. The bonding agent can be, more particularly, mortar, cement, ultra fine cement, silicate gel or even plastic solutions. To increase the erosion factor and thus the range, the jet can additionally be surrounded by compressed air via an annular nozzle. The hardening of the bonding agent results in the formation of a half-columnar, columnar or lamellae-like ground improvement member.

According to a preferred embodiment, two level rods are introduced into the soil, wherein both rods are circumferentially offset relative to the jet grouting tool, more particularly so as to be arranged on opposed sides. By using two level rods it is possible to reliably determine whether the jet and, respectively, the ground column to be produced, comprises the required radial extension or diameter around the circumference of the drilling tool. If two level rods are used, these are preferably arranged diametrically opposed relative to the borehole, i.e. they are offset relative to one another by substantially 180°, with this value comprising certain angular deviations of up to ±10°. Needless to say it is also conceivable to use three or more rods which preferably should be uniformly circumferentially distributed around the borehole to be produced.

The at least one level rod is arranged at a distance from the axis of the jet grouting tool, i.e. of the borehole to be produced, which distance preferably amounts to at least 0.75 meters and/or a maximum of 1.25 meters. If several level rods are used, it is proposed according to an advantageous embodiment that at least two of the level rods comprise different distances from the borehole to be produced. By selecting different distances for the first level rod and the second level rod respectively from the borehole, the diameter of the ground column to be produced can be reliably determined and controlled, respectively. Thus, a first distance of a first level indicting rod can be selected to be identical to or slightly larger than the required radius of the ground column; the second level rod can be set to a second distance which is greater than the first distance. If then the drilling tool is rotated while the jet is activated, with vibrations being determined at the first level rod, whereas no vibrations or only slight vibrations occur at the second level rod, it can be concluded that the radius of the ground column is located in the annular region between the first and the second level rod. More particularly, the two level rods can be arranged relative to the borehole in such a way that the difference between the first distance (of the first level indicting rod relative to the drilling axis) and the second distance (of the second level rod relative to the drilling axis) amounts to at minimum of 5 to 10 cm and/or a maximum of 15 to 20 cm.

The sensor used for recording vibrations is preferably arranged at the upper end of the respective level rod, which, more particularly projects from the ground. In the context of the present disclosure, "upper end", more particularly refers to the rod portion which is positioned above the ground edge and can therefore easily be reached for the purpose of fixing the associated sensor to it. During the vibration recording process, the sensor remains in a fixed position at the level rod. The respective sensor is connected to the associated level rod in such a way that any vibrations or structure-borne sound of the level rod are transmitted directly to the sensor, i.e. without any intermediate medium such as water. For instance, the sensor can be clamped or bolted to the rod or form-fittingly connected thereto, or in any other way releasably fastened thereto, so that the jetting-related vibrations can easily be transmitted from the level rod to the sensor. The sensors are connected to an electronic unit which is able to further process and store the vibration signals. According to an advantageous embodiment, the sensor used is a vibration sensor, more particularly a piezo sensor, with other vibration sensors not being excluded.

According to a further advantageous embodiment there is provided a process stage for converting the recorded vibration signals into acoustic signals by the electronic unit. The advantage of acoustic signals is that these can be easily processed and visualised by standard market-related audio software. Each circulating movement of the level rod can be represented by a peak, so that the size and regularity of the peaks allow conclusions regarding the strength of contact between the jet and the level rod. The acoustic signals can be recorded and evaluated immediately. The signals can be indicated by an indicator such as a monitor.

According to an advantageous embodiment, at least one parameter which is used for variably setting the maximum radial range of the jet can be controlled as a function of the recorded vibration signals. More particularly, the parameter(s) can already be controlled during said process, which means that the recorded information can be used immediately for controlling and influencing the production of the ground column. Parameters suitable for influencing the depth of penetration of the jet and thus the radius (and diameter respectively) of the ground column are, more particularly the rotational speed and/or the lifting speed and/or the jet pressure of the jet grouting tool.

Furthermore, the above objective is achieved by providing an assembly for determining the radius of a ground column produced by the jet grouting process, which assembly comprises: at least one level rod which can be introduced into the ground; a sensor which is connected to the level rod and which is able to record vibrations of the level rod; a jet grouting tool for producing a ground column; and an electronic unit which is connected to the sensor and which is able to further process data recorded by the sensor.

By means of the inventive assembly the advantages mentioned in connection with the proposed process can be achieved, to which reference is hereby made. Accordingly, said assembly, in an advantageous way, allows the measured values to be evaluated immediately and/or directly after the completion of the ground column, with these measured results allowing accurate conclusions regarding the radius and diameter respectively of the ground column.

According to a preferred embodiment, there are provided several level measuring indicators of which each comprises a vibration sensor. The at least one level rod is preferably provided in the form of a metal rod. Metal is advantageous in that its degree of conductivity of body-borne sound is high, as a result of which the vibration signal which is generated by the jet hitting the rod can easily be transmitted to the sensor. More particularly, the level rod can be provided in the form of a solid component which can easily transmit vibrations, but it is understood that a tubular member can also be used as a level rod. The vibration sensors can be piezo sensors for example which are fixed to the upper end of the rod and can record rod vibrations. More particularly, the piezo sensors can record accelerations which result from the vibrations the level rod. To that extent, an acceleration recorded by the piezo sensors constitutes a physical parameter which represents a vibration of the level rod. The vibrations of the level rod are transmitted via the direct connection with the sensor to said sensor. During the vibration recording process the sensor remains fixed to the level rod and in a stationary position. At the end of the vibration process, the sensor can be removed from the level rod.

According to an advantageous embodiment it is proposed that the electronic unit comprises a converter unit by means of which a vibration signal of the respective level rod can be converted into an acoustic signal. Furthermore, it is proposed to provide an evaluation device and/or an indicating device by means of which the acoustic signals can be evaluated or indicated.

The jet grouting tool can form part of a drilling device which carries the tool and by means of which the tool can be introduced into the ground.

BRIEF DESCRIPTION OF THE DRAWINGS

A preferred embodiment will be described below with reference to the drawing wherein
FIG. 1A illustrates a side view of the inventive assembly;
FIG. 1B illustrates a plan view of the inventive assembly;
FIG. 1C illustrates a front view of the inventive assembly showing a lowered jet grouting tool.

DETAILED DESCRIPTION OF THE INVENTION

Figure 2B:
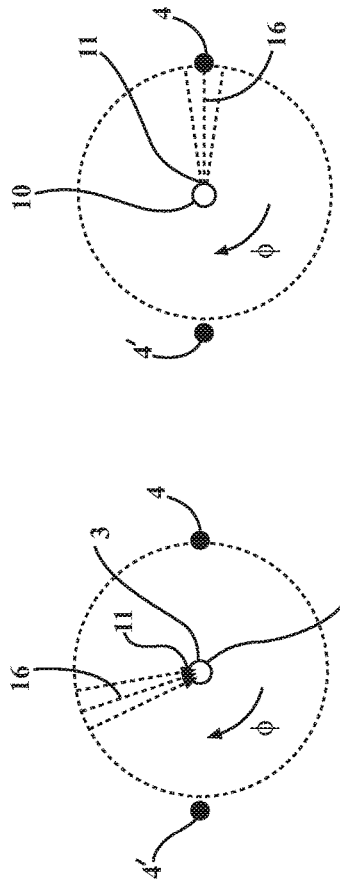
FIG. 2B illustrates the jet grouting tool in a first rotational position.

FIG. 1A-FIG. 4 will be described jointly below. They show an assembly 2 and a process for carrying out a process for determining the diameter of ground columns produced by a jet grouting process, respectively for determining the range of the jet of a jet grouting process. The assembly 2 comprises a jet grouting tool 3 and one or several level rods 4 with vibration sensors 5, as well as an electronic unit 6 for evaluating vibration signals.

The jet grouting tool 3 forms part of drilling device 7 which is positioned on a ground surface 8. A leader 9 is attached to the drilling device 7. Said leader 9 comprises a longitudinally movable carrier device (slide) for carrying a jet grouting rod 10 for the jet grouting tool 3. The jet grouting tool 3 comprises one or several exit nozzles 11 via which an injection material can be ejected through the jet grouting rod 10 into the in-situ soil 12, and possibly a drilling crown 13 which is arranged at the end of the jet grouting rod 10.

The jet grouting rod 10 is longitudinally movably connected to the leader mast 9 via the carrying device. At the upper end of the jet grouting rod 10 there is provided a flushing head 14 which can be moved vertically at the leader mast 9, as well as a rotary drive 15 which serves to rotatably or pivotably drive the jet grouting rod 10. The flushing head 14 which is also referred to a swivel serves to connect feed pipes for introducing the injection material. The injection material can be suspensions consisting of water and a bonding agent such as cement; optionally, they can also be surrounded by air. For the purpose of lowering the jet grouting tool 3 into the ground, the flushing head 14 and the jet grouting rod 10 are moved downwards.

Furthermore, the assembly 2 comprises level rods 4, 4' of which there are provided two in the present embodiment. Each level rod 4, 4' comprises a vibration sensor 5, 5' by means of which a signal representing vibrations can be recorded. For instance such a signal can be the body-borne sound or the vibrations, respectively accelerations of the level rod 4, 4' which are generated when a jet 16 hits the level rod 4, 4'. The vibration sensors 5, 5' are attached to the respective level rod 4, 4' in such a way that the vibrations are transmitted directly from the rod to the sensor. During the process of recording the vibrations, the sensors 5, 5' remain stationary fixed in position at the respective level rod 4, 4'. The vibration indicating sensors 5, 5' are each arranged at the upper end of the associated level rod 4, 4', which end can be for instance the free end of the rod 4, 4', as shown, or, generally speaking, it can be the rod portion which projects from the ground. The sensors 5, 5' are electronically connected to the electronic unit 6 to which the vibration signals are passed. In the present embodiment, the electronic connection is effected by electric lines 17, but a wireless connection is also conceivable. The level rods 4, 4' are provided in the form of metal rods which can easily transmit vibrations or body-borne sound from regions in the ground to the region of the respective sensor 5, 5'. The vibration sensors can be provided in the form of piezo sensors for example.

The electronic unit 6 comprises a converter device by means of which a vibration signal of the level rod 4, 4' can be converted into an acoustic signal. Furthermore, it can comprise an evaluation unit by means of which the acoustic signals can be evaluated. An audio analyser can be used to derive audio spectra from the vibration signals. An indicating device 18 (display) can be used to visualise the derived information. For this purpose, the electronic unit can comprise a peak/level indicator for example for the vibration sensor(s). The acoustic signals and the audio spectra respectively can optionally be stored by a recording unit, more particularly in a sound-data format such as MP3. Such data can be transmitted to a computer by means of a suitable interface such as a universal serial bus (USB).

Figure 2C:
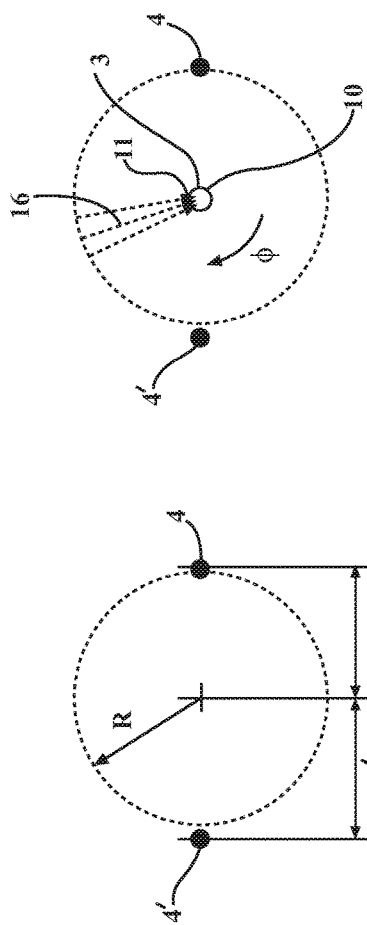
FIG. 2C illustrates the jet grouting tool in a second rotational position.
Figure 2A:
FIG. 2A illustrates distances of the level rods.
Figure 3:
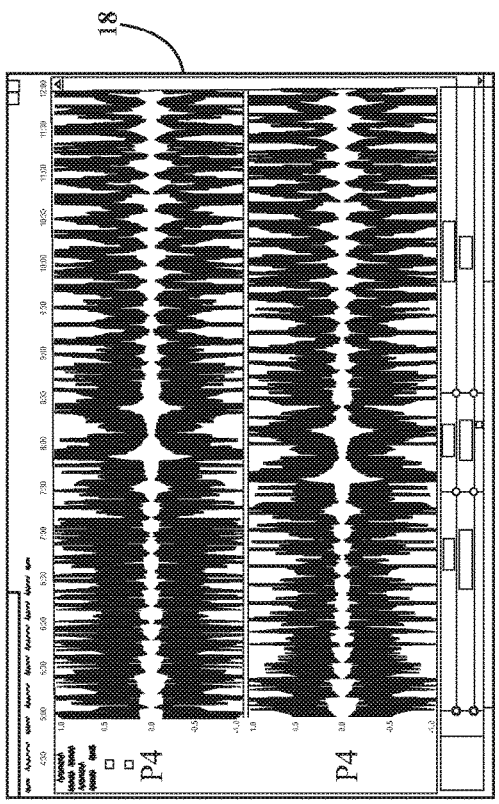
FIG. 3 shows an inventive process for determining the radius of a ground column produced by the jet grouting process.

The process is carried out as follows: during a first process stage S10 the level rods 4, 4' are introduced into the ground. In the present embodiment there are provided two level rods 4, 4' which, in the assembly according to FIG. 1A-1C, are arranged at the same distance from the drilling axis A of the borehole to be produced. Alternatively, the distances of the two level rods from the axis of the ground member to be produced can differ, as shown in FIG. 2A-C, where the first distance B of the first level rod 4 is selected so as to be slightly longer than the required radius R of the ground column; the second distance B' of the second level rod 4' is again slightly longer than the first distance B. By positioning the level rods 4, 4' at different distances from the axis A, the diameter of the ground column to be produced can be determined and controlled particularly reliably because it is possible to obtain measurements for the different depths of penetration.

Irrespective of the distances among each other, the level rods 4, 4'—with reference to the borehole and the axis A of the ground member to be produced—are preferably arranged such that their position at least corresponds to the radius R of the ground member to be produced, respectively to the penetration depth of the jet, i.e. it can be equal to or greater than the radius R. The distances B, B' between the respective level rod and the borehole to be produced can range between 0.75 and 1.25 meters.

In the course of the next process stage S20, the jet grouting tool 3, while rotating around its axis, is lowered into the ground down to its end depth T which marks the lower end point of the ground member to be produced. In principle, the jet grouting tool 3 can also be introduced into the soil without carrying out a rotational movement. The lowered condition of the jet grouting tool is shown in FIG. 1C. After the jet grouting tool 3 has reached the required end depth T, the ground member is produced.

The ground member is produced during process stage S30 while the vibration signals are recorded at the same time. For this purpose, the jet grouting tool 3 is pulled upwards while rotating at the same time, more particularly up to the point of reaching the ground edge 8, wherein, while the tool 3 is being pulled up, an injection material exits under a high pressure from one or several nozzles 11, while eroding the surrounding ground and being mixed with same. After the bonding agent contained in the injection material has hardened, a ground member 19 is present which, for the sake of clarity, is shown in dashed lines in FIG. 1A-1C.

The rotational movement of the jet grouting tool 3 is defined by a phase angle φ as a function of time t. FIG. 2B shows the jet grouting tool 3 in a first rotational position in which the nozzle 11 respectively the jet 16 is arranged in a circumferential region between the two level rods 4, 4'. In FIG. 2C, the jet grouting tool 3 has been rotated further around the drilling axis A, wherein, in the shown position, the jet 16 hits the first level rod 4, thereby generating a vibration in the process. After the level rod 4 has been rotated further by 180°, the jet 16 points towards the second level rod 4'. Because the latter is further away from the tool axis A, either only slight or no vibrations can be measured here. The process is carried out from the bottom to the top. During the rotational and pulling movement of the jet grouting tool 3—with an activated jet—vibrations of the level rods 4,4' are recorded by the vibration sensors 5, 5'.

In a subsequent process stage S40, the recorded vibration signals are further processed and evaluated by the electronic unit 6, respectively by a computer connectable thereto.

Figure 4:
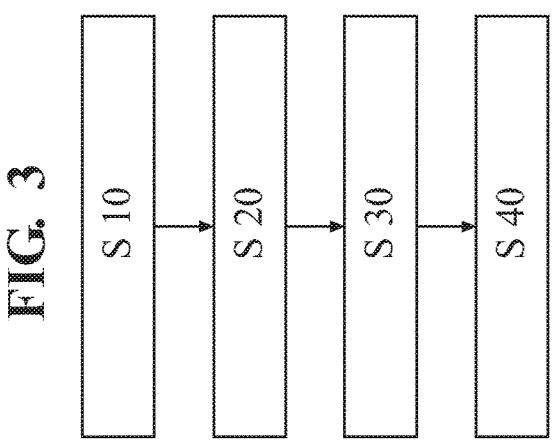
FIG. 4 shows an evaluation of vibration data based on the vibration signals recorded in accordance with the invention.

Such an evaluation of the vibration signals is shown in FIG. 4. In the upper row, a first vibration signal P4 is shown as a function of time, which vibration signal 4 was determined from the vibrations recorded at the first level rod 4. In the lower row a second vibration signal P4' is shown which is based on the vibrations recorded at the second level rod 4'. The diagrammatically illustrated acoustic vibrations signals allow conclusions regarding the depth of penetration of the jet 16, whereby conclusions can be drawn regarding the diameter of the ground column produced.

If, for example, vibrations are determined at the first level rod 4 which is arranged so as to be closer to the jet grouting tool 3, whereas no vibrations are recorded at the second level rod 4' which is positioned further away from the second level rod 4', it can be concluded that the radius of the ground column is positioned in the annular region between the first and the second level rod 4, 4'. In the example shown in FIG. 2A-C, the first level rod is arranged at a distance of approximately 90 cm from the drilling axis and from the jet grouting tool respectively, whereas the second distance of the second level rod amounts to approximately 110 cm. It is understood that the level rods can also comprise the same distance from the axis A or that they can comprise distances from axis A which deviate from the values mentioned.

The inventive method of determining the depth of penetration of the jet of a jet grouting tool, and, respectively, the radius of ground columns produced by the jet grouting process, is advantageous overall in that it is possible to simultaneously record vibration data while producing the ground column and, optionally, evaluate same. Thus, the parameters affecting the depth of penetration of the jet can be controlled/changed quickly, so that the ground column to be produced comprises a high degree of dimensional accuracy. Reliable measurements can also be achieved in greater depths.

LIST OF REFERENCE NUMBERS 2 assembly
3 jet grouting tool
4 level rod
5 sensor
6 electronic unit
7 drilling tool
8 ground surface
9 leader
10 jet grouting tool
11 exit nozzle
12 ground
13 drilling crown
14 flushing head/swivel
15 rotary drive
16 jet
17 pipeline
18 indicating device
19 ground member
A axis of rotation/column axis
B distance
R radius
T depth

The invention claimed is:

1. A process for determining the radius of a ground column which is produced by jet grouting, the process comprising the steps:
introducing at least one level rod into the ground and lowering a jet grouting tool in such a way that the at least one level rod and the jet grouting tool comprise a defined distance from one another, which is smaller than or equal to a maximum range of a jet of the jet grouting tool;
lifting the jet grouting tool while carrying out at least one of rotational or pivoting movements while the jet is activated, so that the jet passes the at least one level rod in different depths, wherein, when the jet passes the at least one level rod, vibrations are generated at the at least one level rod by the jet passing the at least one level rod in different depths; and
recording vibrations received by a sensor fixed to the at least one level rod.

2. A process according to claim 1, wherein the at least one level rod includes two level rods that are introduced into the ground, wherein, with reference to the jet grouting tool, the two level rods are arranged so as to be circumferentially offset relative to one another.

3. A process according to claim 2, wherein a first one of the two level rods is arranged at a first distance relative to the axis of the jet grouting tool and a second one of the two level rods is arranged at a second distance relative to the axis.

4. A process according to claim 3, wherein the first level rod and the second level rod are arranged in such a way that a difference between the first distance and the second distance amounts to at least one of a minimum of 10 cm and a maximum of 20 cm.

5. A process according to claim 1, wherein relative to an axis of the jet grouting tool, the at least one level rod is arranged at a distance of at least one of a minimum of 0.75 meters and a maximum of 1.25 meters.

6. A process according to claim 1, wherein the sensor is fixed to an upper end of the at least one level rod.

7. A process according to claim 1, wherein while the vibrations are being recorded, the sensor is stationary fixed to the at least one level rod.

8. A process according to claim 1, wherein the sensor is a piezo-sensor.

9. A process according to claim 1, wherein there is provided a further process step by: converting the vibrations into acoustic signals by an electronic unit.

10. A process according to claim 9, wherein there is provided a further process step by: at least one of recording and displaying of the acoustic signals.

11. A process according to claim 1, wherein a further process step is provided by: controlling at least one parameter by which a maximum radial range of the jet can be variably adjusted as a function of the vibration detected, wherein said at least one parameter is selected from a rotational speed and a lifting speed and a jet grouting pressure of the jet grouting tool.

12. An assembly for determining a radius of a ground column which is produced by jet grouting, comprising:
at least one level rod which is configured to be introduced into the ground;
a jet grouting tool for producing a ground column by ejecting an injection material under rotational or pivoting movements of the jet grouting tool, wherein vibrations are generated when a grouting jet of the jet grouting tool passes the at least one level rod;
a sensor that is fixed at the at least one level rod and that is configured to record the vibrations generated at the at least one level rod in different depths when the grouting jet laterally passes the at least one level rod; and
an electronic unit that is connected to the sensor and is configured to further process data recorded by the sensor.

13. An assembly according to claim 12, wherein a second level rod with a second sensor is provided, wherein the second sensor is connected to the electronic unit.

14. An assembly according to claim 12, wherein the at least one level rod is provided in the form of a metal rod.

15. An assembly according to claim 12, wherein the at least one level rod is solid.

16. An assembly according to claim 12, wherein the sensor at the at least one level rod is held in a fixed position during a vibration recording process.

17. An assembly according to claim 12, wherein the electronic unit comprises a converter device which is configured to convert a vibration signal into an acoustic signal.

18. An assembly according to claim 12, wherein the electronic unit is operably connected to at least one of an evaluating unit and an indicating unit, the evaluating unit is configured to evaluate the vibrations of the at least one level rod and the indicating unit is configured to display the vibrations of the at least one level rod.

* * * * *